(12) United States Patent
Lauer

(10) Patent No.: US 6,735,049 B1
(45) Date of Patent: May 11, 2004

(54) ELECTROMAGNETIC HEADS, FLEXURES AND GIMBALS FORMED ON AND FROM A WAFER SUBSTRATE

(76) Inventor: Mark A. Lauer, 1898 Brooktree Way, Pleasanton, CA (US) 94566

( * ) Notice: Subject to any disclaimer, the term of this patent is extended or adjusted under 35 U.S.C. 154(b) by 97 days.

(21) Appl. No.: 10/112,004

(22) Filed: Mar. 28, 2002

(51) Int. Cl.⁷ .............................................. G11B 21/16
(52) U.S. Cl. ................................................... 360/244.1
(58) Field of Search ........................... 360/244.1–244.7

(56) References Cited

U.S. PATENT DOCUMENTS

| | | | |
|---|---|---|---|
| 5,041,932 A | 8/1991 | Hamilton | |
| 5,065,271 A | 11/1991 | Matsuura et al. | |
| 5,166,845 A | * 11/1992 | Thompson et al. | |
| 5,198,945 A | * 3/1993 | Blaeser et al. | |
| 5,228,184 A | 7/1993 | Kishi | 29/603 |
| 5,430,768 A | 7/1995 | Minuhin et al. | 375/340 |
| 5,452,151 A | 9/1995 | Money et al. | 360/75 |
| 5,453,315 A | 9/1995 | Hamilton et al. | 428/209 |
| 5,546,027 A | 8/1996 | Shinozaki et al. | 327/59 |
| 5,557,488 A | 9/1996 | Hamilton et al. | |
| 5,663,854 A | 9/1997 | Grill et al. | |
| 5,704,112 A | 1/1998 | Katase et al. | 29/603.12 |
| 5,745,979 A | 5/1998 | Fontana, Jr. et al. | 29/603.12 |
| 5,867,888 A | 2/1999 | Voldman et al. | 29/603.12 |
| 5,896,246 A | 4/1999 | Budde et al. | |
| 5,909,340 A | 6/1999 | Lairson et al. | |
| 5,917,859 A | 6/1999 | Yamasaki et al. | 375/252 |
| 5,969,904 A | 10/1999 | Alt et al. | |
| 6,046,891 A | * 4/2000 | Yoda et al. | |

FOREIGN PATENT DOCUMENTS

| | | | |
|---|---|---|---|
| JP | 61120327 A | * 6/1986 | |
| WO | WO 096/29697 | 9/1996 | |
| WO | WO 098/00841 | 1/1998 | |

OTHER PUBLICATIONS

Shuyun Wu et al., "Silicon micromachined integrated suspension systems for magnetic disk drives," Sensors and Actuators A 55 (1996) pp. 195–200.

* cited by examiner

*Primary Examiner*—Allen Cao

(57) ABSTRACT

Devices for transducing electromagnetic information are formed on and from a wafer substrate. The devices comprise a head attached to a flexible element such as a gimbal. To create such a device, a transducer and an optional amplifier are formed on a wafer that is then cut into rows containing a number of such transducers. The rows are then processed from directions generally normal to the wafer surface upon which the transducer was formed, by removing material to form a head and flexible elements such as a gimbal, creating a media-facing surface on the head and at least one aperture adjacent the head. Conductive leads may be formed on a non-media-facing surface of a flexible element to connect the transducer with drive electronics. Conventional problems of connecting the head to the flexure and/or gimbal are eliminated, as both are made from the same wafer on which the transducer is formed. The transducer layers may be oriented generally perpendicular to the media surface, making use of proven transducer designs. The heads can be made thinner than is conventional and do not need a large area on the trailing surface for bonding pads, reducing their mass and moment arms. Low profile gimbals and flexures created with this invention can be more closely aligned with forces arising from interaction with the media surface and from seeking various tracks, reducing torque and dynamic instabilities. Spacing between disks can be reduced due to the thin heads and low profile gimbals and flexures.

20 Claims, 7 Drawing Sheets

US 6,735,049 B1

ELECTROMAGNETIC HEADS, FLEXURES AND GIMBALS FORMED ON AND FROM A WAFER SUBSTRATE

CROSS-REFERENCE TO RELATED APPLICATION

The present application claims the benefit under 35 U.S.C. § 120 of U.S. patent application Ser. No. 09/438,123, filed Nov. 9, 1999, which is incorporated by reference herein.

TECHNICAL FIELD

The present invention relates to transducers such as electromagnetic heads, gimbals and flexures for holding such heads.

BACKGROUND OF THE INVENTION

Conventional electromagnetic heads such as those employed in disk or tape drives are formed in a plurality of thin films on a substrate, after which the substrate is cut or diced. In this manner a single wafer may yield many hundreds of heads. After formation, each head may then be attached to an arm for positioning the head adjacent the media. The arm may be attached to the head by flexure or gimbal elements, which allow the head to adjust relative to the media surface, compensating for imperfections in that surface or other dynamics.

Conventional disk drives have an actuator which positions a pair of such arms or load beams adjacent each spinning disk, the arms each holding a smaller flexure and gimbal that is mechanically connected to the head. Twisted wires have traditionally provided electrical connections between such heads and drive electronics, the wires held by tubes or crimps along the load beam and soldered to electrical bond pads on the head. Recently, so called wireless suspensions have been implemented, which use conductive leads that run along flexures and gimbals to provide signal communication with the head, although connections between the leads and conductive pads on the head are conventionally made by wire bonding. These wireless suspensions are typically laminated and include layers of stainless steel for strength, with conductors such as copper isolated by plastic or other dielectric materials.

The conductive traces still need to be bonded to pads on the head, but usually impart less mechanical uncertainty to the gimbal mechanism than twisted wires, and can be connected by machines for wire stitching. In order to reduce the size of such gimbals and flexures, U.S. Pat. No. 5,896, 246 to Budde et al. proposes fabricating a magnetic head suspension assembly from a silicon structure using etching techniques. A similar idea is described in U.S. Pat. No. 5,724,015 to Tai et al., which appears to have resulted from an industry-government partnership exploring the fabrication of head suspensions from silicon parts.

U.S. Pat. No. 5,041,932 to Hamilton goes a step further, fabricating the entire head and flexure from thin films that are then lifted from the wafer on which they were formed. The resulting integrated head and flexure, which is generally plank-shaped, does not have a gimbal structure for conforming to the media, instead relying on ultralight mass and continuous contact for mechanical stability, durability and high resolution. The thin films of Hamilton's flexhead are formed in layers that are primarily parallel to the media surface, unlike most conventional disk heads, which are formed in layers that end up on a trailing end of the head, extending perpendicular to the media surface.

Recent years have witnessed dramatic growth in the use of magnetoresistive (MR) sensors for heads, which sense magnetic fields from a disk or tape by measuring changes in electrical resistance of the sensors. Care is usually taken to avoid sensor contact with a rapidly spinning rigid disk, as such contact may destroy the sensor or create false signal readings. In order to increase resolution, however, current production heads may fly at a height of one micro-inch from the disk surface. MR sensors are typically formed along with inductive write transducers in thin films on a wafer substrate. After formation, the wafer is diced into sliders each having thin film inductive and MR transducers on a trailing end, the sliders' length determined by the wafer thickness.

As heads become smaller, connection of even modern wireless suspensions becomes difficult and may add undesirable mechanical complexities to the gimbal area. Moreover, MR sensors can be delicate and require at least two extra leads that must be connected to the drive electronics, adding to connection difficulties. Additionally, as heads are required to fly closer to the media and provide quicker access time to various tracks on the disk, mechanical challenges increase.

SUMMARY OF THE INVENTION

The present invention provides an integrated head, flexure and/or gimbal structure formed on and from a wafer substrate. Conventional problems of connecting the head to the flexure and/or gimbal are eliminated, as both are made from the same wafer on which the transducer is formed. The transducer layers may be oriented generally perpendicular to the media surface, affording employment of the most proven high-resolution transducer designs. Electrical leads may also be formed on the integrated flexure and/or gimbal in contact with leads of the head.

Heads of the present invention can be made thinner and do not need a large area on the trailing surface for bonding pads, reducing their mass and moment arms. The gimbals and flexures can be more closely aligned with forces arising from interaction with the disk surface and from seeking various tracks, reducing torque and dynamic instabilities. Spacing between disks can be reduced due to the thinner heads and lower profile gimbals and flexures. The heads may be operated in continuous or intermittent operational contact with the media, or may be designed to avoid such contact during operation.

DETAILED DESCRIPTION OF THE PREFERRED EMBODIMENTS

Figure 1:
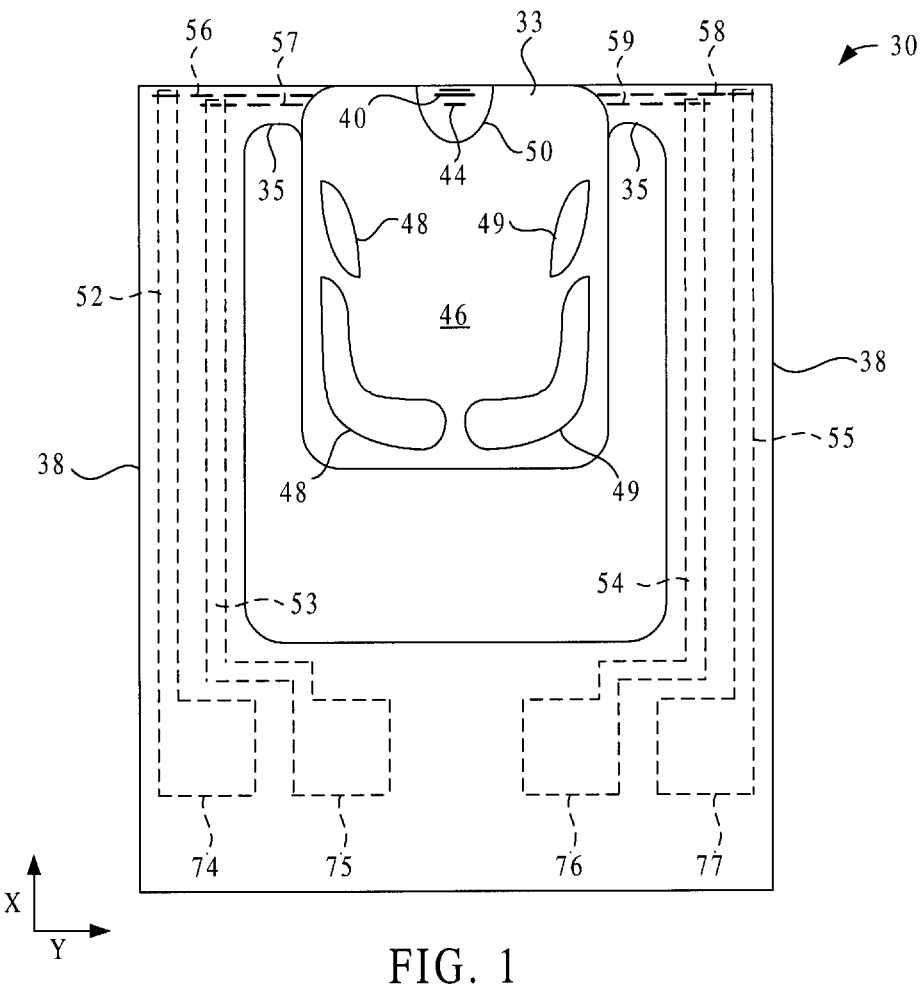
FIG. 1 is a media-facing side of a device of the present invention including an integrated head, gimbal and flexure.

FIG. 1 shows a media-facing side of a device 30 of the present invention including an integrated head 33, gimbal 35 and flexure 38. The head 33 includes an inductive transducer 40 and a magnetoresistive (MR) transducer 44. As will be explained in greater detail below, the transducers 40 and 44 are formed along with many other similar transducers on a wafer substrate, after which the wafer is cut into rows each containing a number of the transducers, and the rows are then processed from another direction to form the integrated head 33, gimbal 35 and flexure 38.

A media-facing surface 46 of the head 33 includes rails 48 and 49 and a transducer-containing pad 50 that are designed to be closer than the remainder of the media-facing surface to the media during operation. The rails 48 and 49 and pad 50 may project about a micron or less from the remainder of the bearing surface 46. The gimbal 35 and flexure 38 are much thinner than the head, in order to increase flexibility of the gimbal and flexure. The gimbal 35 and flexure 38 may also be disposed further from the media than the media-facing surface 46 of the head 33, in order to remove them from interactions with the media or gases or liquids that travel with the media.

Figure 2:
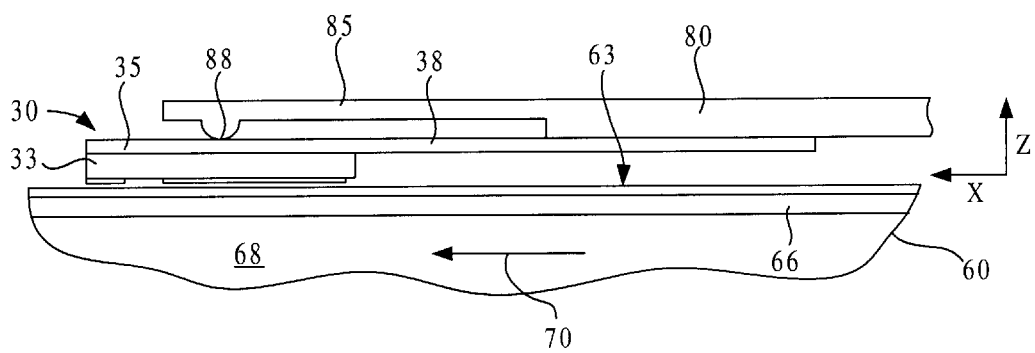
FIG. 2 is a side view of the device of FIG. 1 interacting with a media such as a rigid disk.

FIG. 2 shows a side view of the device 30 interacting with a media 60 such as a rigid disk, a cross-section of which is shown. The media 60 has a surface 63 and a media layer 66 formed over a substrate 68, and is travelling relative to the head 33 in a direction indicated by arrow 70. The head 33 may have a thickness in a direction perpendicular to the media surface 63 that is on the order of 100 $\mu$m, whereas the gimbal 35 and flexure 38 may have a thickness of only 5 $\mu$m–50 $\mu$m in that direction. For clarity, the direction perpendicular to the media surface is defined as the Z-direction, whereas a direction perpendicular to the Z-direction and substantially aligned with the direction of media travel is defined as the X-direction, while a direction orthogonal to the X and Z-directions is defined as the Y-direction. As is conventional in the disk drive industry, a distance measured along the Z-direction away from the media may be referred to as a Z-height. Flexible elements 35 and 38 can be seen to extend substantially along the X-Z plane, while transducers 40 and 44 each include a plurality of films that extend substantially parallel to the Y-Z plane.

The gimbal 35 and flexure 38 are much closer in height to the center of mass of the head 33 than is conventional, reducing dynamic instabilities that otherwise can occur during track seeking and settling, and therefore reducing access times. This alignment of suspension height and head mass is due in part to having the top surface of the flexure aligned with the top surface of the head, whereas conventional suspensions have their bottom surface located above the top of the head and tapering down to meet the head top surface at bond areas. Also, the head of the present invention can be reduced in height, since large areas on the back of the slider are not needed for providing conductive connections with the suspension. Having a relatively low gimbal 35 and flexure 38 also helps to align those suspension members with forces generated by interaction with the disk 60, whether due to contact or near contact. This helps to achieve lower flying heights and avoids crashes that may otherwise occur due to wobbling sliders whose corners plow into the disk.

Referring additionally to FIG. 1, a plurality of conductive leads 52, 53, 54 and 55 are disposed in the flexures 38, connected with transducer leads 56, 57, 58 and 59 disposed in gimbal elements 35. As will be explained in more detail below, transducer leads 56, 57, 58 and 59 can be defined during formation of transducers on a wafer to provide guidance during row bar processing for the formation of gimbals 35 and flexures 38 of a desired thickness. Conductive bond pads 74, 75, 76 and 77 provide connections for device 30 with a load beam 80. Load beam 80, which may be made of conductive and insulative laminates, has an extending tongue 85 with a dimple 88 that provides a fulcrum for head 33. Although not shown in FIG. 2, the tongue may extend past the head in the X-direction. The dimple may be formed by pressing, for the situation in which the tongue 85 contains stainless steel, for instance, or by deposition and/or patterning for the situation in which the tongue 85 is formed by similar means.

Figure 3:
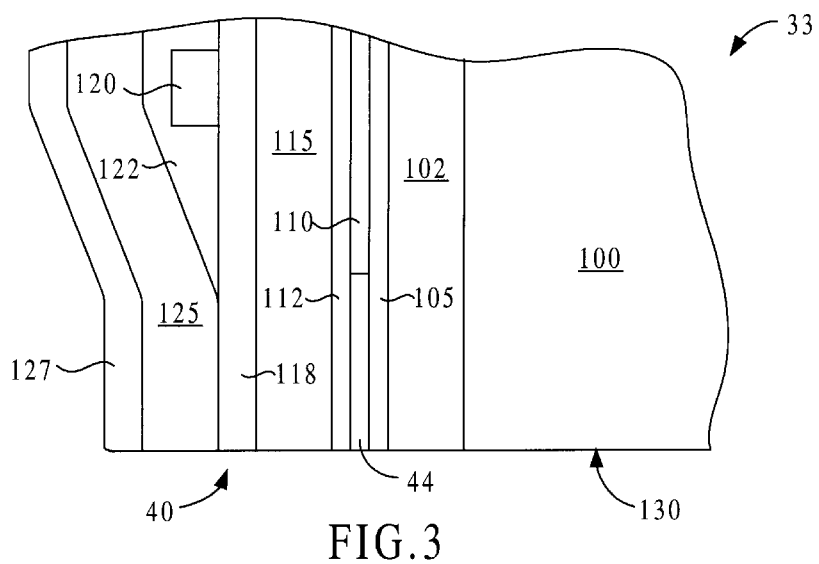
FIG. 3 illustrates some initial steps in forming the head of FIG. 1.
Figure 4:
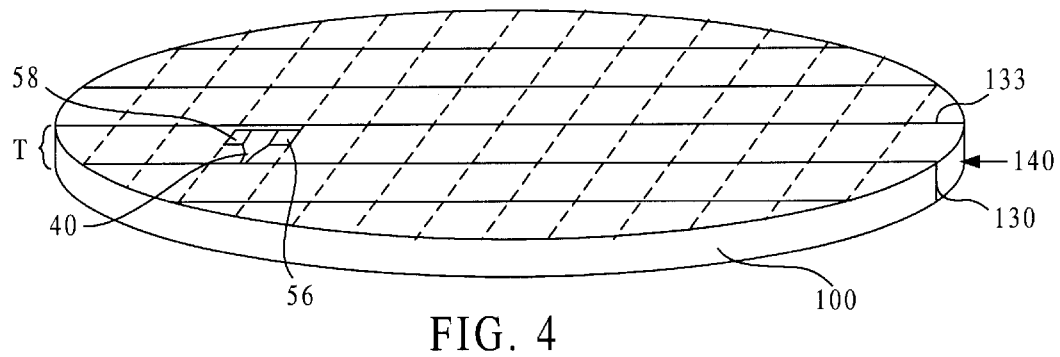
FIG. 4 shows the partially formed head of FIG. 3 during formation on a wafer substrate.

In FIG. 3 some initial steps in forming the head 33 are shown. The head 33 is formed on a wafer substrate 100, also shown in FIG. 4, that may be made of alumina ($Al_2O_3$), alumina titanium carbide ($Al_2O_3$—TiC), silicon (Si), silicon dioxide ($SiO_2$), silicon carbide (SiC) or other known materials, the head being mass-produced along with hundreds or thousands of other heads. The substrate may be insulating or resistive, and is typically nonmagnetic. Substrates containing silicon are generally preferred for their ability to be deeply, quickly and controllably etched. Also, as described below, transistors may be formed on the substrate adjacent transducers 40 and 44 for signal amplification, for which silicon can be advantageous. The dimensions of the head, flexure and gimbal elements are determined based upon known characteristics of the materials forming the substrate and film layers. Note that etching or other removal processes used for patterning the head, flexure and gimbal elements are controllable in three dimensions rather than two, affording design flexibility.

After polishing and preparing a surface of the wafer substrate 100, a first magnetically permeable layer 102 is formed of a material such as Permalloy (NiFe), which will function as a magnetic shield. A first read gap layer 105 of a nonmagnetic, electrically insulating material such as alumina, silicon dioxide or diamond-like carbon is then formed, on top of which the magnetoresistive (MR) sensor 44 is formed. The MR sensor 44 may be an anisotropic magnetoresistive (AMR) sensor, spin valve (SV) sensor, giant magnetoresistive (GMR) sensor, or other known sensors, the details of which are known in the art and omitted here for conciseness. After the MR sensor 44 has been formed the leads 57 and 59, shown in FIG. 1, are defined. A back gap 110 and second read gap 112 of electrically insulating, nonmagnetic materials such as alumina, silicon dioxide or diamond-like carbon are also formed.

A first pole layer 115 of magnetically permeable material such as permalloy is then formed for transducer 40, layer 115 also serving as a shield for the MR sensor 44 in this example of a merged head. Note that in other embodiments greater separation of the MR transducer 44 and the inductive transducer 40 may be desirable. A nonmagnetic, electrically insulating write gap 118 of material such as alumina, silicon dioxide or diamond-like carbon is formed on the pole layer, and a conductive coil 120 is formed on the write gap 118, the coil surrounded by nonmagnetic, electrically insulating material 122 such as baked photoresist. Conductive leads 56 and 58 connect with the coil 120 to provide current for inducing a magnetic flux across recording gap 118, the leads also helping to define dimensions for the gimbal, as will be shown below. A second pole layer 125 of magnetically permeable material is then formed, and a protective coating 127 of alumina, DLC or other materials is conventionally formed. Other known transducers may be formed instead of the above example of a merged head.

Figure 5:
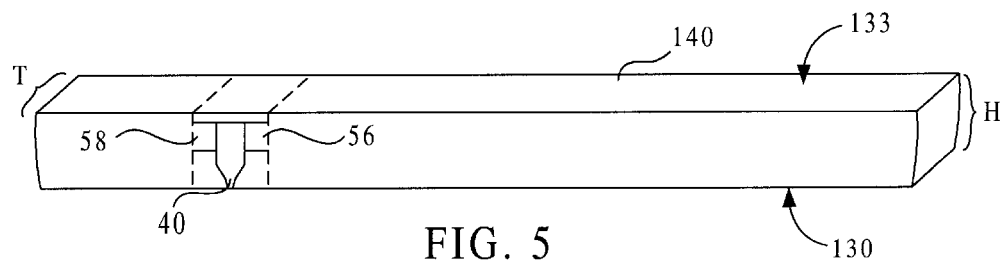
FIG. 5 shows a row cut from the substrate of FIG. 4, the row including the head of FIG. 3.

The substrate and thin film layers are then cut along a number of lines such as lines 130 and 133, forming for example one hundred rows of heads from a single wafer 100. FIG. 5 shows row 140 cut from the substrate 100, with the recently formed inductive transducer 40 and leads 56 and 58 visible through the transparent protective coating. The wafer 100 thickness T will determine the length of the integrated head and flexure 30 of row 140 and all other rows. Processing of row 140 then occurs on surfaces 130 and 133, both of which may be lapped to thin and smooth the head and flexure 30. Surface 130 is lapped while resistive leads are monitored to obtain a desired height of transducers 40 and 44. The polished row 140 has a height H which may be about 100 microns in this example, but which may be tailored to significantly different heights depending upon desired implementations. After lapping, surfaces 130 and 133 are masked and etched to form the desired media-facing surface, head, gimbal and flexure that are depicted in FIG. 1.

Figure 6:
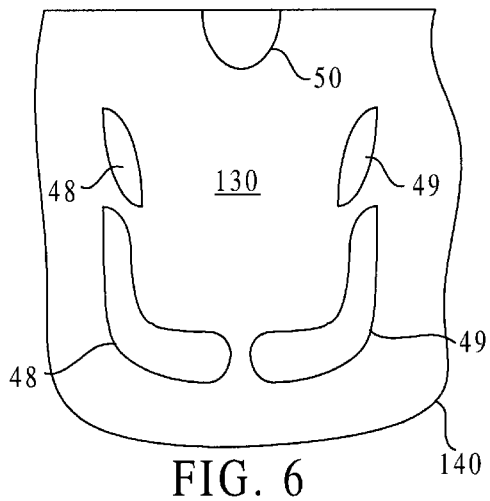
FIG. 6 shows the formation of air bearing rails and pads of the media-facing surface of the head of FIG. 1.
Figure 7:
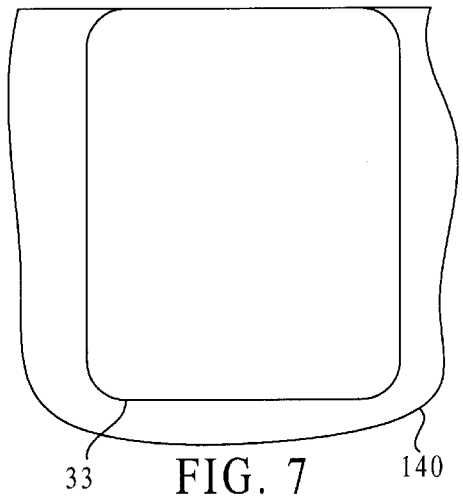
FIG. 7 shows the masking of the head of FIG. 1 during material removal that shapes the media-facing side of the gimbal and flexure of FIG. 1.

As shown in FIG. 6, all of surface 130 is exposed to etching, preferably by ion beam etching (IBE) or reactive ion etching (RIE), except for photoresist or other masking that covers rails 48 and 49 and pad 50, while rails and pads of other heads of row 140 are covered by similar masks, not shown. After the rails 48 and 49 and pad 50 have been formed, which project from the rest of the media-facing surface of the head on the order of a micron, a thick mask is formed over the head 33 and other heads of the row 140, as shown in FIG. 7.

A multimicron, highly anisotropic etch is then performed that removes the suspension flexure and gimbal from the media-facing surface of the head 33. This etch, preferably performed by RIE, removes a substantial fraction of the row 140 height H between surfaces 130 and 133, except in the area of the head 33 which is covered by the thick mask. As known in the art of MicroElectroMechanical Systems (MEMS) such etching can have high aspect ratios of perpendicular versus lateral etching, so that tens of microns of etching in the Z-direction may be accomplished with less than one micron of etching in the X-direction or Y-direction. Exact control of the depth of etching in the Z-direction may be accomplished by timing or by monitoring the etching process for evidence of conductors 56 and 58, which have been formed to a distance predetermined to serve as an etch-stop signal. A protective coating of diamond-like carbon (DLC), tetrahedral amorphous carbon (ta—C), silicon carbide (SiC) or the like may then be formed on the rails 48, 49, pad 50, gimbal 35 and flexure 38. For the situation in which such a protective coating was formed over the media-facing surface prior to defining pads 48, 49 and 50, the head 33 is not coated again.

Figure 8:
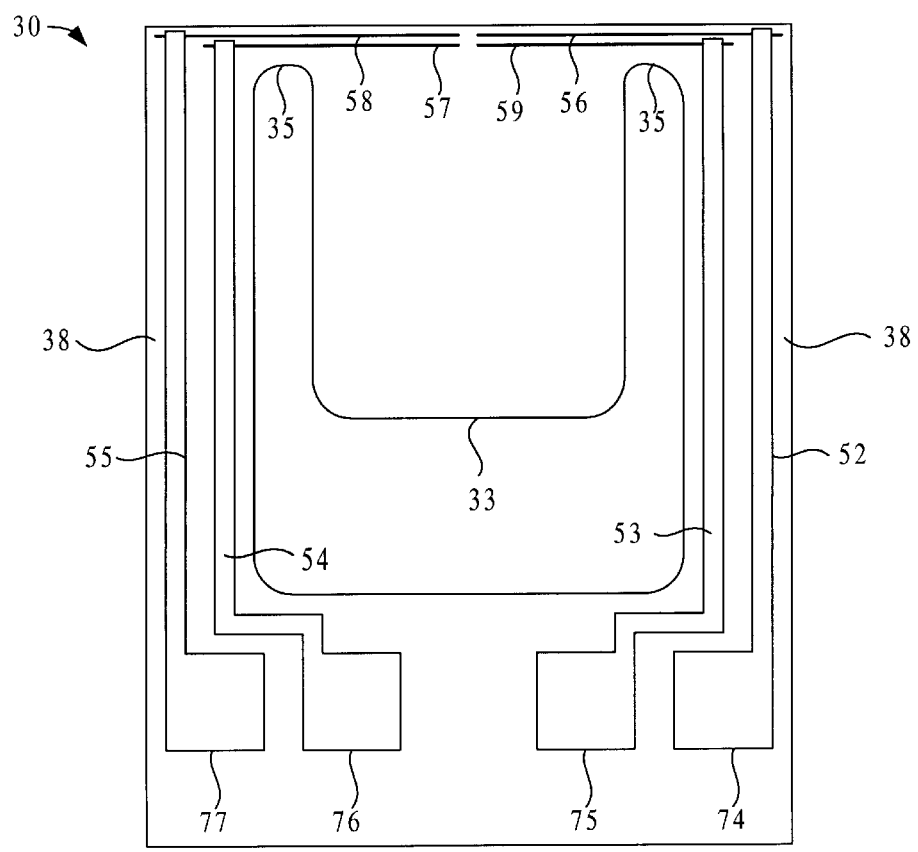
FIG. 8 shows the formation of a non-media-facing side of the device of FIG. 1.

The row 140 is then turned over to work on surface 133, which will become a non-media-facing surface, as shown in FIG. 8. If conductors 56–59 have not already been exposed by lapping of this surface, etching can be performed until evidence of these conductors occurs, determining height H with precision. The head 33, flexures 38 and gimbals 35 are then covered with a thick mask, and a multi-micron perpendicular etch is performed on row 140 that defines a U-shaped aperture between those elements. Conductors 52–55 and pads 74–77 are then formed, for example of gold (Au), copper (Cu), beryllium copper (BeCu) or aluminum (Al). A protective insulative coating is then formed, except over pads 74–77. Individual device 30 may be severed from other devices at this point by cutting or further etching.

The device 30 may be connected to the load beam 80 by various methods. Epoxy bonding can be used for mechanical connection, for example, while wire bonding or stitching can provide electrical connections between pads 74–77 and electrical leads formed on a non-media-facing side of the load beam. Alternatively, ultrasonic bonding may be used to connect pads 74–77 with electrical leads formed on a media-facing side of the load beam. Distancing such bonding from the head and gimbal area removes mechanical uncertainties and complexities from the most sensitive area of device 30, in contrast with conventional head and gimbal connection mechanisms.

Figure 9:
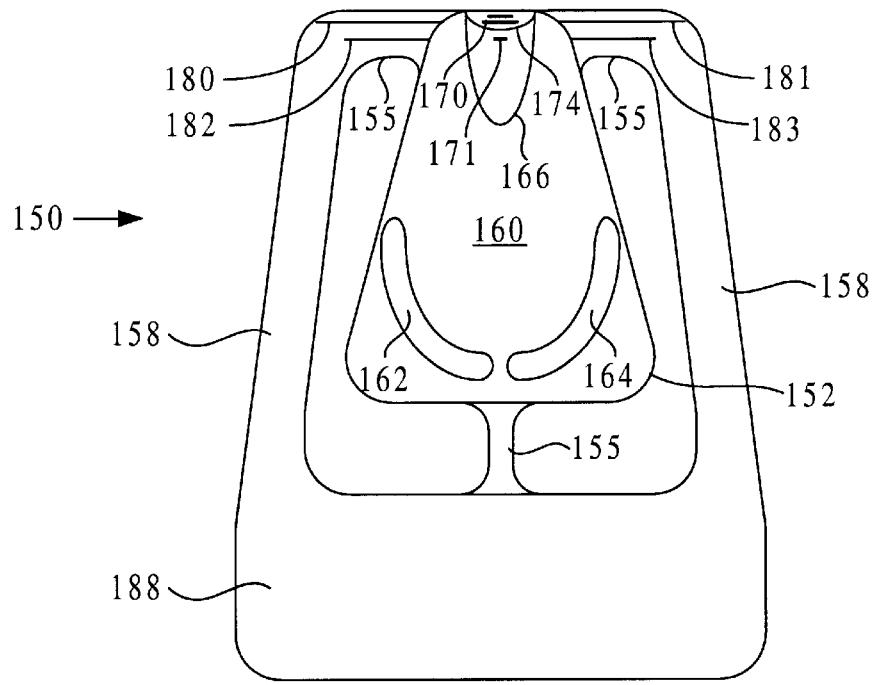
FIG. 9 shows a disk-facing side of another embodiment of the present invention.

FIG. 9 shows a disk-facing side of another embodiment of the present invention, in which a device 150 including a head 152, gimbal elements 155 and flexures 158 may be formed from less wafer real estate than that used for a conventional pico-slider. The head 152 has a generally triangular disk facing surface 160 with rails 162 and 164 and pad 166 projecting slightly. An inductive transducer 170 and a MR transducer 171 are visible through a transparent protective coating on pad 166, with the inductive transducer disposed in a slightly projecting area 174 compared to the MR transducer. This slight difference in elevation between the inductive transducer 170 and the MR transducer 171, which may be on the order of 100 Å, allows the former to write at high resolution while the latter avoids thermal asperities and wear that may otherwise be caused by operational contact with the disk. Conductive leads 180 and 181 connect with the inductive transducer 170 while leads 182 and 183 connect with the MR transducer 171, the leads formed along with the transducers and exposed during etching of the gimbal elements 155, the exposure signaling completion of etching the gimbal elements. A base 188 is formed to provide mechanical and electrical connections for the device.

Figure 10:
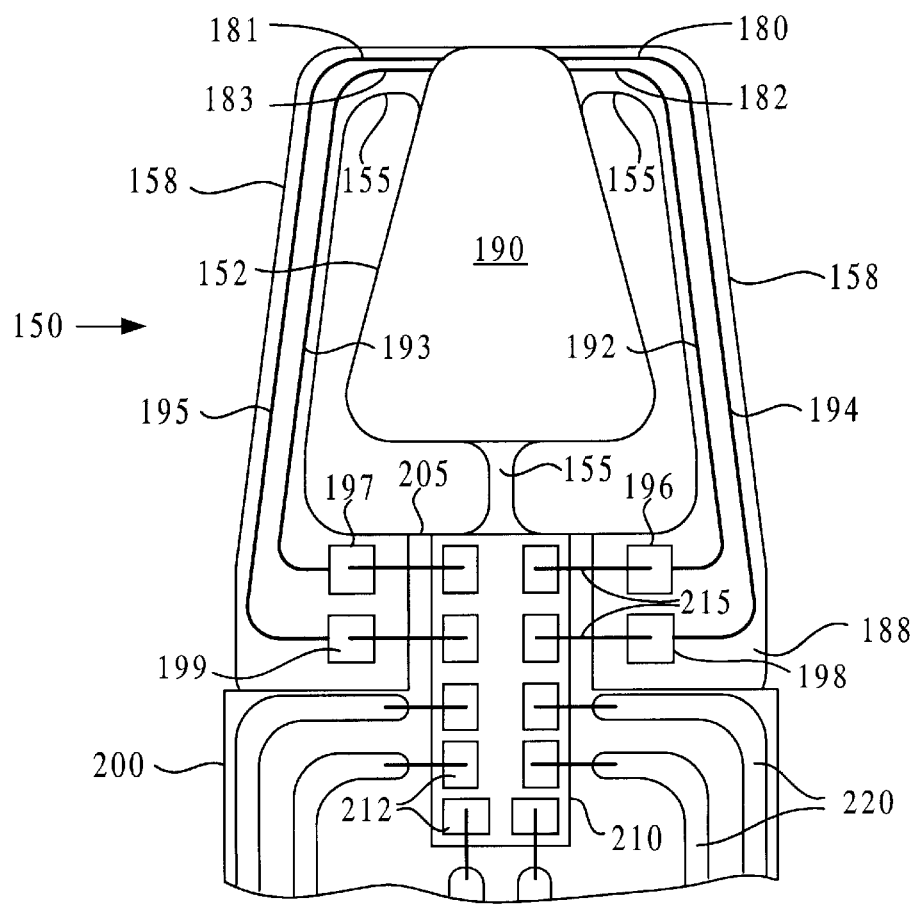
FIG. 10 shows an opposite side from that shown in FIG. 9, including an amplifier attached to a load beam and connected with leads disposed on the flexure and gimbal that are connected with the head.
Figure 11:
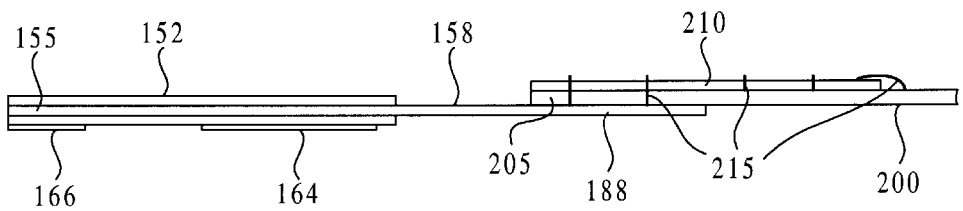
FIG. 11 is a side view of the suspension elements of FIG. 9, illustrating a flexure located close in Z-height to the center of mass of the head.

FIG. 10 shows a non-disk-facing side of device 150, connected to a load beam 200. The gimbal 155 and flexure 158 elements have also been etched or ablated from this side to the point at which conductors 180–183 are exposed, so that those suspension elements are not coplanar with a non-disk-facing 190 surface of the head 150. As can be seen in FIG. 11, this allows the suspension elements including flexure 158 to be located closer in height to the center of mass of the head 152. Aligning the height of suspension elements closer to the center of mass of the head reduces torque that would otherwise occur during rapid movement of the head from one disk track to another, during which time the head experiences extreme acceleration and deceleration.

Conductive leads 192 and 193 are formed along flexures 158 connecting inductive transducer leads 182 and 183 with pads 196 and 197, respectively. Similarly, conductive leads 194 and 195 are formed along flexures 158 connecting MR transducer leads 180 and 181 with pads 198 and 199, respectively. After masking the head 152, gimbal 155, flexure 158 and base 188, the non-disk-facing side is etched or ablated again to create voids and separate device 150 from adjacent devices.

Device 150 is then connected to load beam 200, which has short tongue 205 that bonds with a central portion of base 188, as shown additionally in FIG. 11. An amplifier chip 210 is attached to the beam 200 and extends onto the tongue, the chip having a number of bond pads 212. Bond pads 196–199 of the device are connected to bond pads 212 of the chip, for example by wires 215.

Figure 12:
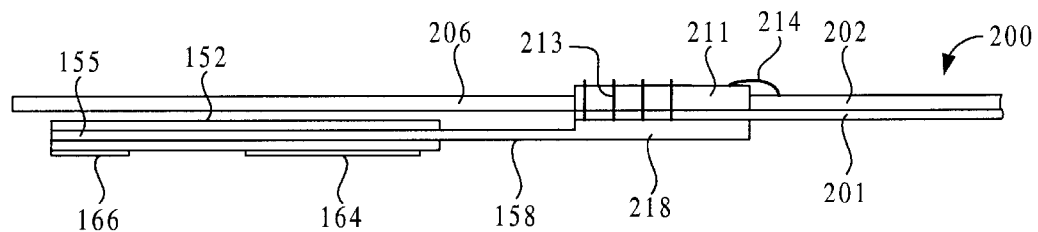
FIG. 12 is a side view similar to that of FIG. 11 but with a load beam having a tongue that extends over the head.

In FIG. 12, load beam 200 is made of layers 201 and 202, with layer 201 having a tongue 206 that extends over head 150 to provide protection and a shock-absorbing backstop for the head in the event of a shock to the drive. An amplifier chip 211 is attached to layer 201 on one side of tongue 206, layer 201 being attached to a pedestal 218 of device 150. A similar chip may be attached on the same side of another arm sharing the space between disks, not shown, so that the chips are offset and avoid each other. Wires 213 and 214 provide electrical connections between chip 211 and leads on the device 150 and beam 200, respectively.

Figure 13:
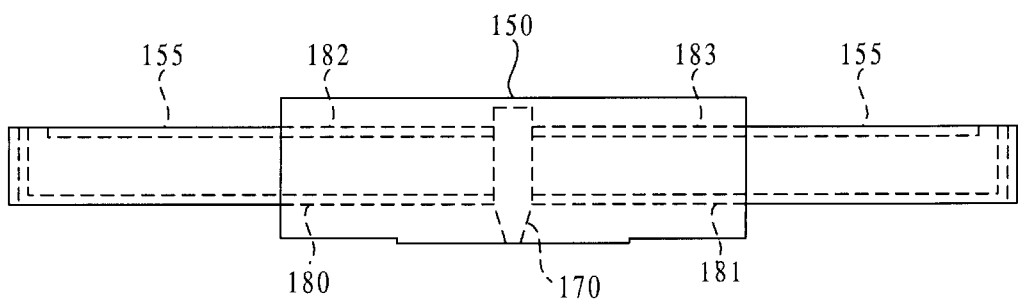
FIG. 13 is view of a trailing end of the device of FIG. 9.

As shown in FIG. 13, conductive leads need not span the gimbals in the Z-direction in order to define etch stops for the gimbals. For instance, MR transducer leads 182 and 183 can define an etch stop for the non-disk-facing side of the gimbals 155 while inductive transducer leads 180 and 181 can define an etch stop for the disk-facing side of the gimbals, with a connector leading to the non-disk-facing side. Timing can be employed to control the extent of etching in addition to or instead of monitoring for etch stop materials.

Figure 14:
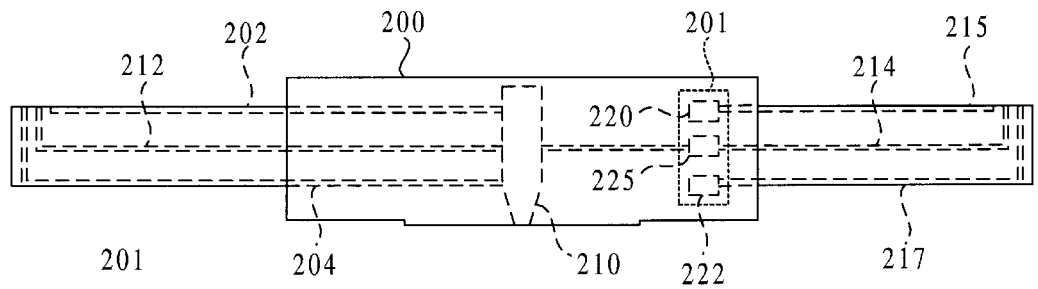
FIG. 14 is view of a trailing end of the device of FIG. 9, including an amplifier formed on the head.

Beginning with FIG. 14, a head 200 is illustrated that includes a transistor amplifier 201 formed adjacent to the read and write transducers. A pair of write leads 202 and 204 are connected to a coil, not shown, of an inductive transducer 210. A pair of sense leads 212 and 214 are connected to a MR transducer, which is disposed behind the inductive transducer and therefore not shown in this figure for clarity. Amplifier leads 215 and 217 extend adjacent to sense lead 214, and terminate at source electrode 220 and drain electrode 222, respectively. Sense lead 214 is connected to a gate electrode 225 that is disposed over a semiconductor region forming a gate for transistor 201. Source electrode 220 and drain electrode 222 are disposed over source and drain regions having opposite conductivity type to that of the gate. A mechanism such as a resistor is disposed in series with lead 214 distal to the MR transducer and optionally on the head, so that changing resistance in the MR transducer responsive to a signal from the media changes the voltage on gate electrode 215. This change in voltage on the gate electrode may be amplified on the order of 100 times in the amplifier leads. Note that this simple example of a single transistor 201 may be supplanted by a CMOS transistor, known amplifier and/or detector circuits. Examples of detector circuits that may be formed on the head are described in U.S. Pat. Nos. 5,546,027, 5,430,768 and 5,917,859, incorporated by reference herein, for which some electronics such as clock generators may be provided separately, for instance adjacent the load beam or actuator. Perhaps one thousand square microns of chip real estate may be available on the trailing edge of head 200 for formation of amplifier and/or detector circuits.

Figure 15:
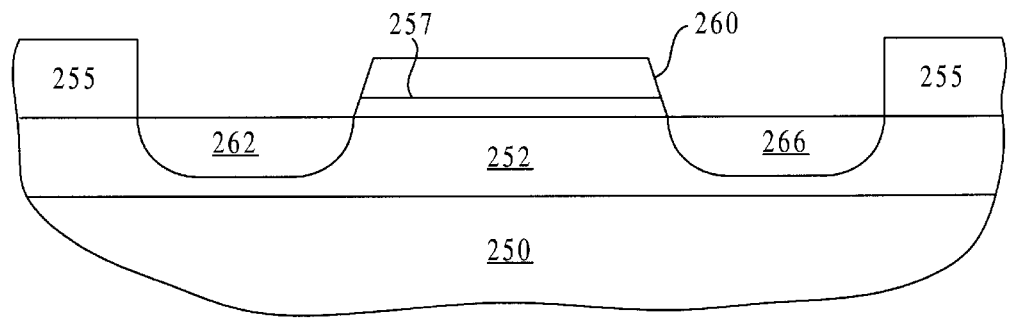
FIG. 15 is a cross-sectional view of an initial stage in forming the amplifier of the head of FIG. 14.

FIG. 15 shows some initial steps in the formation of the head of FIG. 14. On a preferably silicon wafer substrate 250 that will eventually be patterned to form a head and flexure, a P-type semiconductor layer 252 is formed. In an alternate embodiment the wafer may be doped P-type or N-type and layer 252 need not be formed, as known in the art of integrated circuit fabrication. An oxide layer 255 is grown on semiconductor layer 252, masked and etched, leaving an area of the P-type layer 252 upon which a gate oxide layer 257 is formed. A doped polysilicon gate 260 is formed atop gate oxide 257 and both are trimmed to leave areas for N-type, self-aligned source 262 and drain 266 to be formed by ion implantation. The wafer may after ion implantation be annealed at temperatures exceeding 500° C., as known in the art of circuit fabrication.

Figure 16:
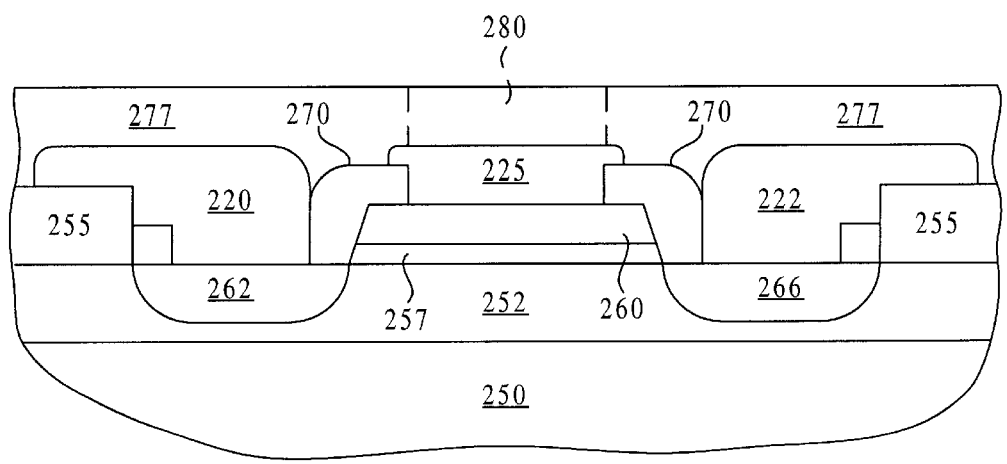
FIG. 16 is a cross-sectional view of the amplifier of the head of FIG. 14, prior to the formation of a transducer on the head.

In FIG. 16, another oxide layer has been formed, masked and etched to create dielectric regions 270, leaving gate 260, source 262 and drain 266 exposed, upon which gate electrode 225, source electrode 220 and drain electrode 222 are respectively formed. Another dielectric layer 277 is then formed, for example of $SiO_2$, creating a smooth planar surface for subsequent formation of a magnetic shield layer, not shown in this figure. A via may be etched in this layer 277, the via then being filled with conductive material to form an electrical interconnect 280 between gate electrode 225 and sense lead 214. Additional interconnects may be stacked on interconnect 280 to complete a conductive path to sense lead 214 through a dielectric layer formed adjacent the first shield and first read gap layer. Note that the preceding description of a most basic transistor amplifier can be extrapolated to the formation of much more complicated circuits, any of which may be included in a head of the present invention.

Figure 17:
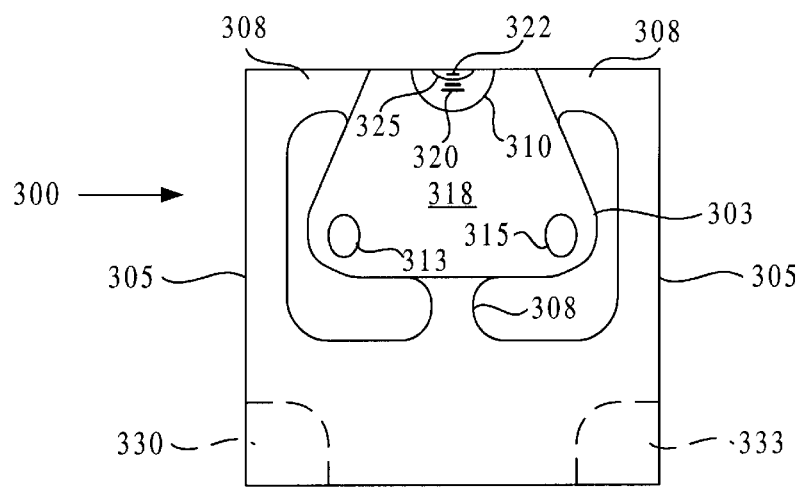
FIG. 17 is a media-facing side of a media-contacting embodiment of the present invention including an integrated head, gimbal and flexure.

FIG. 17 shows a transducing device 300 including a head 303 integrated with flexure 305 and gimbal 308 elements. The device 300 has been formed on and patterned from a ceramic substrate such as a silicon wafer, much as described above. The head 303 has a media-facing surface with three projections, pads 310, 313 and 315, which are designed for contact or near contact with a rapidly moving media surface such as that of a rigid disk. Since head 303 does not have large air bearing surfaces such as rails, the head can be very small and light, so that the device 300 may be significantly smaller than a pico-slider. The pads 310, 313 and 315 may project from a recessed area 318 of the media-facing surface by between about a micron and ten microns, and are preferably coated with an extremely hard, wear resistant coating such as DLC, ta—C or SiC. An inductive transducer 320 has poletips terminating on or adjacent an exposed surface of pad 310 for close proximity to the media, so that sharp and strong magnetic patterns can be written on the media. A MR or GMR transducer 322 terminates adjacent to a recessed portion 325 of pad 310 that avoids contact with the media even when the remainder of pad 310 contacts the media, so that a read transducer 322 such as a MR or GMR sensor avoids wear and thermal asperities, as described in U.S. Pat. No. 5,909,340, incorporated by reference herein.

The flexure 305 and gimbal 308 may have a non-media-facing surface that is generally coplanar with a non-media-facing surface of the head, simplifying removal of material from the non-media-facing side. The flexure 305 and gimbal 308 may instead have a media-facing surface that is generally coplanar with the recessed area 318 of the head, in order to align the flexure and gimbal with dynamic forces of the head/media interface. The head 303 may contain amplifier circuitry, and conductive leads may be formed along the non-media-facing sides of flexure 305 and gimbal 308 elements, as described above.

Figure 18:
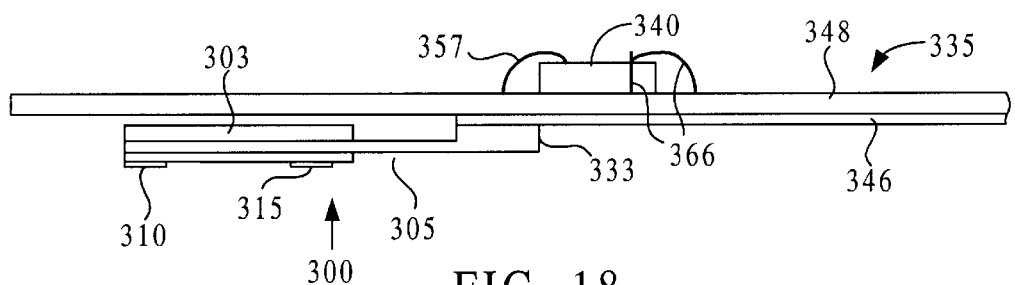
FIG. 18 is a side view of the embodiment of FIG. 17 attached to a load beam that extends over the head and holds an amplifier.

Alternatively, as shown in FIG. 18, the flexure 305 and gimbal 308 may have a different Z-height than both major surfaces of the head, so that the flexure and gimbal are flexible in the Z-direction as well as aligned with the Z-height of the center of mass of the head, reducing torque during seek and settle operations. The device in this example has a pair of pedestals 330 and 333 that have a similar Z-height as the surface of the head 303 facing away from the media, the pedestals being attached to a laminated load beam 335, which may contain stainless steel for strength and convenience. Instead of forming separate pedestals for bonding to the load beam, the device may have a continuous plateau distal to the transducers for attachment to the load beam. An amplifier chip 340 is disposed on the load beam and electrically connected to the device and beam by wires 342 and 344, respectively. The load beam includes a lower layer 346 that is bonded to pedestals 330 and 333, and an upper layer 348 that extends over the head 303 in a loop 350, as seen in the top view of FIG. 19.

Figure 19:
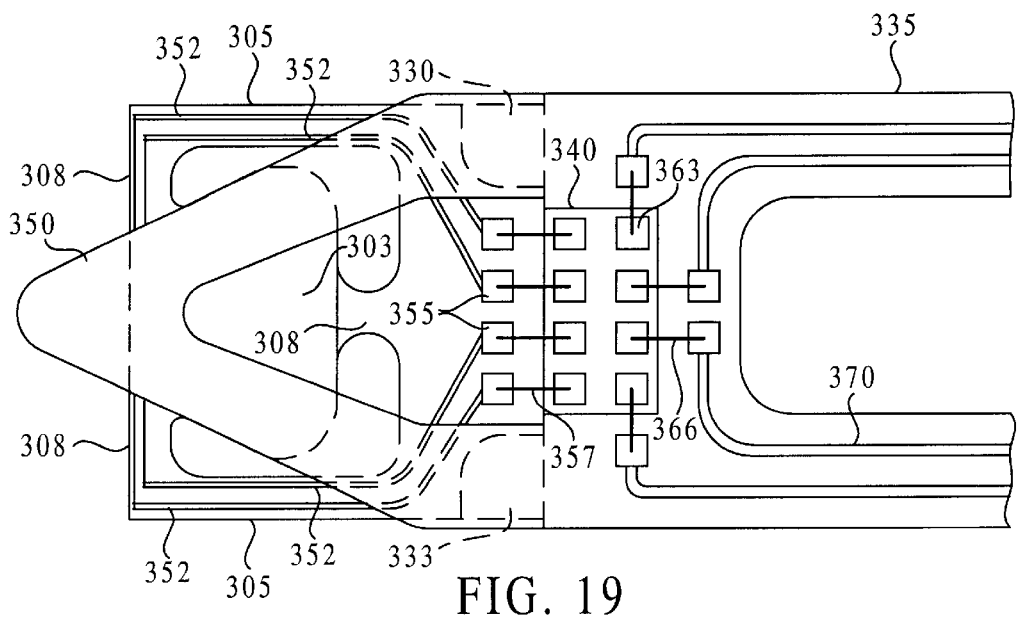
FIG. 19 is a top view of the head, flexure and beam of FIG. 18, with the amplifier connected with leads disposed on the flexure and gimbal that are connected with the head.

Also apparent in FIG. 19 are a plurality of electrical conductors 352 leading between the head and a corresponding plurality of contact pads 355 disposed on device 300 near pedestals 330 and 333. Wires 357 connect pads 355 with input/output pads 360 on chip 340. Additional input/output pads 363 on chip 340 are connected by other wires 366 to electrical conductors 370 disposed on load beam 335 and leading to drive circuitry, not shown. More or less pads and conductors may be employed depending upon the desired implementation, and conductors 370 are separated from conductive material of the load beam 335 by dielectric material, or load beam may be dielectric.

Although the above description has focused on teaching the preferred embodiments, other embodiments and modifications of this invention will be apparent to persons of skill in the art in view of these teachings. For example, a device can be formed on and from a wafer substrate to include a load beam as well as head, flexure and gimbal elements. Alternatively, a device of the present invention can be configured for use in measurement and testing. Therefore, this invention is to be limited only by the following claims, which include all such embodiments and modifications when viewed in conjunction with the above specification and accompanying drawings.

What is claimed is:

1. A device for transducing electromagnetic information, the device comprising:
   a transducer including at least three solid films, said films being substantially parallel to a first plane, and
   a structure adjoining said transducer, said structure shaped as a rigid body adjacent to said transducer and shaped as a plurality of flexible elements distal to said transducer, said flexible elements extending along a second plane that is substantially perpendicular to said first plane, wherein said rigid body and said flexible elements are made of substantially identical material.

2. The device of claim 1, wherein said flexible elements include a gimbal.

3. The device of claim 1, wherein said body includes an amplifier connected to said transducer.

4. The device of claim 1, wherein said material includes silicon.

5. The device of claim 1, wherein said flexible elements are substantially aligned with a center of mass of said body.

6. The device of claim 1, wherein said structure has been formed from a wafer.

7. The device of claim 1, wherein said body has a media-facing-surface and a non-media-facing surface, and at least one of said flexible elements is disposed at a Z-height between said surfaces.

8. The device of claim 1, further comprising a plurality of conductive leads adjoining at least one of said flexible elements.

9. A device for an information storage system, the device comprising:
   a head containing a transducer including at least four substantially parallel solid layers, and
   a flexure attached to said head, said flexure having an elongate dimension that is substantially perpendicular to said layers,
   wherein said head and said flexure are primarily made of the same material.

10. The device of claim 9, wherein said flexure is attached to said head by a gimbal.

11. The device of claim 9, wherein said flexure is formed by removing parts of a wafer substrate.

12. The device of claim 9, wherein said flexure contains silicon.

13. The device of claim 9, wherein said head contains an amplifier connected to said transducer.

14. The device of claim 9, wherein said head has a media-facing-surface and a non-media-facing surface, and said flexure is disposed at a Z-height less than that of said non-media-facing surface.

15. A device for transducing electromagnetic information, the device comprising:
   a transducer including a plurality of substantially parallel, adjoining layers formed on a structure, said structure patterned as a rigid body adjoining said transducer and as a flexible element distal to said transducer, said rigid body and said flexible element containing substantially identical material, wherein said flexible element has an elongate dimension substantially perpendicular to said layers.

16. The device of claim 15, wherein said rigid body and said transducer form a head.

17. The device of claim 15, further comprising a second flexible element adjoining said rigid body, wherein said flexible elements are substantially parallel to a plane that is substantially perpendicular to said layers.

18. The device of claim 15, further comprising a transistor disposed adjacent to said transducer.

19. The device of claim 15, wherein said transducer is configured for communicating with a media, and said body has a media-facing-surface and a non-media-facing surface, wherein said flexible element is disposed at a distance from said media between that of said surfaces.

20. A device for transducing electromagnetic information, the device comprising:

a structure having a rigid section and a flexible section, said structure being made of a substantially homogenous material that is electrically insulating or resistive, said flexible section having a length, a width and a thickness, said thickness being less than said length, and a transducer attached to said rigid section, said transducer including a plurality of solid layers that are substantially parallel to each other and substantially perpendicular to said length.

* * * * *